June 2, 1925. Re. 16,088
W. F. BASSETT
REPLACEABLE TOOL HANDLE
Original Filed Dec. 5, 1919
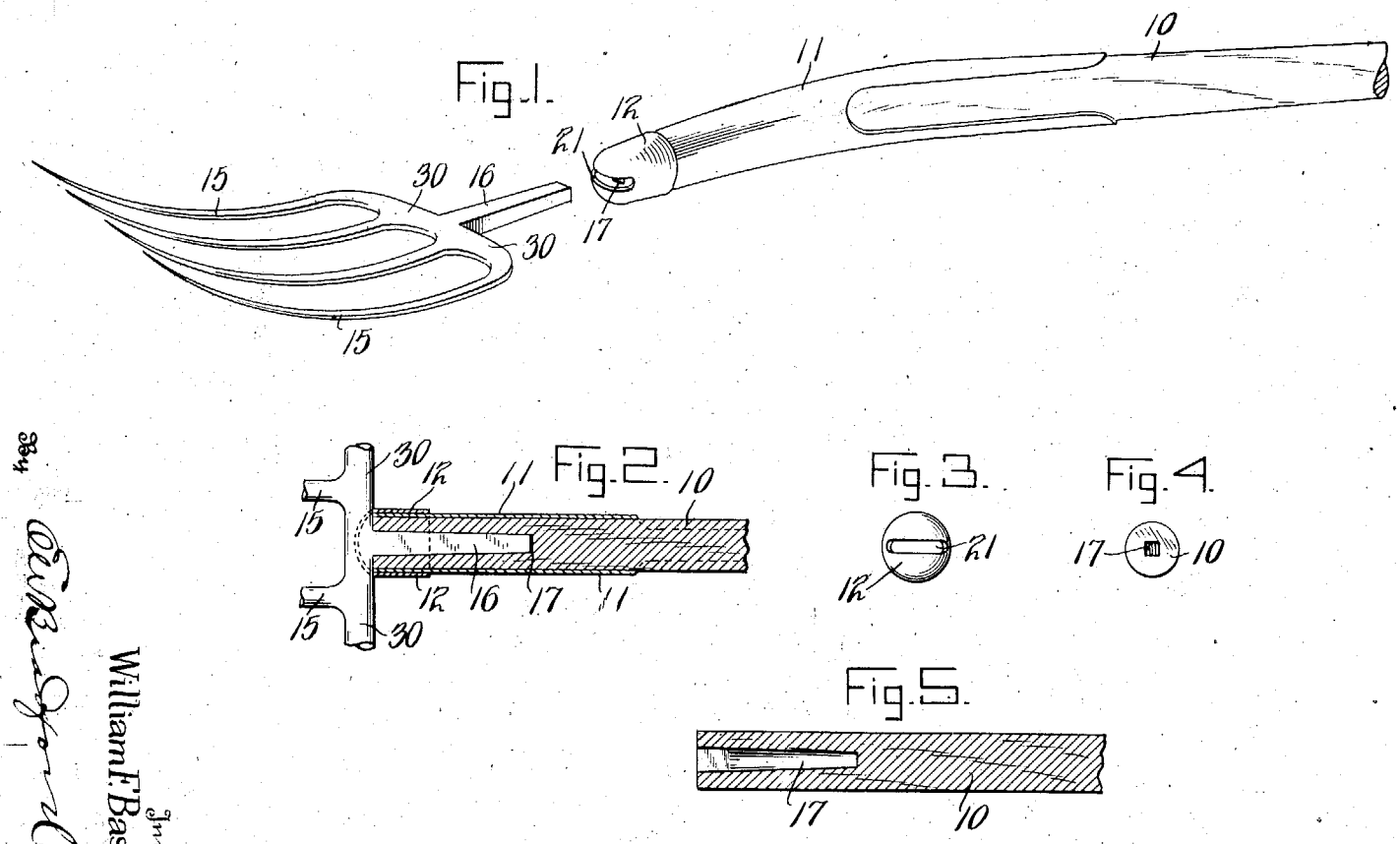
Inventor
William F. Bassett
By E. W. Bradford
Attorney Reissued June 2, 1925. Re. 16,088

UNITED STATES PATENT OFFICE.

WILLIAM FORREST BASSETT, OF COLUMBUS, INDIANA.

REPLACEABLE TOOL HANDLE.

Original No. 1,523,339, dated January 13, 1925, Serial No. 342,573, filed December 5, 1919. Application for reissue filed March 17, 1925. Serial No. 16,255.

*To all whom it may concern:*

Be it known that I, WILLIAM F. BASSETT, a citizen of the United States, residing at Columbus, in the county of Bartholomew and State of Indiana, have invented certain new and useful Improvements in Replaceable Tool Handles, of which the following is a specification.

This invention relates to a replacement tool handle, being particularly adapted for use in effecting the repair of tools in which the handles have been broken and unfit for further service; and one of the objects of the invention consists in the provision of a handle of the above character wherein the proper location of the tool relatively to the handle is definitely fixed, thereby enabling a tool and handle to be quickly and accurately joined together.

A further object of the invention consists in the provision of a tool handle for replacing one that is broken wherein the proper and operative position of the tool is determined and provided for during the manufacture of the handle, so that the tool and handle may be properly joined with the exercise of a minimum amount of skill, thereby saving the user the time necessarily involved in determining the proper working relation of the two parts.

I accomplish the above objects of the invention, and such others as may appear from a perusal of the following description and the claims, by means of the construction illustrated in the accompanying drawings forming a part hereof, in which—

Figure 1 is a perspective view of a hay fork, disconnected from its handle, showing my invention, Figure 2, a fragmentary detail sectional view of the tool holding end of the handle, on an enlarged scale, showing more clearly the form of connection between the tool and handle.

Figure 3, a front elevation of the ferrule arranged on the end of the handle,

Figure 4, a view of the tool holding end of the handle, with the remaining parts omitted.

Figure 5, a fragmentary detail longitudinal sectional view of the handle showing the initial formation of the longitudinal aperture, the remaining parts being omitted.

Referring to the drawings, 10 represents a wooden handle which in form is similar to those commonly employed on hay forks and like tools, and 11 the usual metal reinforcing guard for incasing the tool holding end of the handle 10. 12 is a ferrule which snugly fits the reinforced tool holding end of handle 10. 15 represents a conventional type of hay fork, this class of a tool being shown merely for illustrative purposes, and 16 an integral shank which is inserted into an aperture 17 formed on the longitudinal axis of handle 10.

The common form of square shank has heretofore been introduced into an aperture which was round in cross section throughout its entire length, which aperture was accurately located in the longitudinal axis of the handle at the factory, where facilities were ample for properly joining and alining the two parts, but it is quite obvious with the parts thus constructed that where a new handle was to be attached to an old tool by the user whose skill and facilities were usually limited, the desired alinement between the parts was seldom attained but which generally involved the loss of much time and labor. In the present case however, where the handle during its process of manufacture is provided with an accurately located aperture in which the portion next the end of the handle is square in cross section and the remainder of the aperture being round for receiving a square shank of the tool, the two may be easily and quickly alined and substantially united to prevent their accidental separation, with the exercise of a minimum amount of skill.

With the above differences in mind, handle 10 is formed with an aperture 17 which is square in cross section a short distance from its mouth to receive the correspondingly shaped shank 16 of the tool which insures that the tool and handle will be properly alined when united, this being of utmost importance in curved handles, as shown in Fig. 1, or in handles having a hand-grasp, where a relatively slight disarrangement in the alinement of the parts seriously interferes with the free and easy manipulation of the tool.

As an additional assistance in holding the tool in its proper position in the end of the handle 10, I provide the ferrule 12 which is fitted over the tool holding end of the handle. The free end of ferrule 12 is rounded or convex as shown, and this rounded end extends some distance beyond the end of handle 10. The convex portion of ferrule 12 is provided with a slot 21 adapted to receive the shoulder portion 30 of tool 15, the curved portion of the ferrule extending a considerable distance across the opposite surfaces of shoulder portions 30 of the tool, and materially assisting in resisting movements having a tendency to throw the tool out of its normal position relative to handle 10. While I have described my invention with more or less minuteness as regards details of construction and arrangement and as being embodied in certain precise form, I do not desire to be limited thereto unduly or any more than is pointed out in the claims. On the contrary, I contemplate all proper changes in form, construction and arrangement, the omission of immaterial elements, and the substitution of equivalents as circumstances may suggest or necessity render expedient.

Having thus fully described my said invention, what I claim as new and desire to secure by Letters Patent, is:

1. A wooden handle for use with an agricultural tool having a tang non-circular in section, said handle having a hole conforming in shape at its entrance to the cross-section of the tang whereby the tool may be correctly located relatively to the handle, and said hole being of different shape for the major part of its length whereby displacement of the material of the handle insures against separation of the parts, substantially as set forth.

2. A wooden handle for use with an agricultural tool having a square tang, said handle being bent near its lower end and having at said end a hole square at the entrance and round for the major part of its length, substantially as set forth.

3. A wooden handle for use with an agricultural tool having a tang non-circular in section, said handle having a hole conforming in shape at its entrance to the cross-section of the tang whereby the tool may be correctly located relatively to the handle, and said hole being of different shape for a substantial part of its length whereby displacement of the material of the handle insures against separation of the parts, substantially as set forth.

4. A wooden handle for use with an agricultural tool having a square tang, said handle being bent near its lower end and having at said end a hole square at the entrance and round for a substantial part of its length, substantially as set forth.

5. A wooden handle for use with an agricultural tool having a tang non-circular in section, said handle having a hole conforming in shape at its entrance to the cross-section of the tang whereby the tool may be correctly located relatively to the handle, and said hole being of different shape for a part of its length whereby displacement of the material of the handle insures against separation of the parts, substantially as set forth.

6. A wooden handle for use with an agricultural tool having a square tang, said handle being bent near its lower end and having at said end a hole square at the entrance and round for a part of its length, substantially as set forth.

7. A wooden handle for a tool having a tang non-circular in cross-section; said handle having a hole conforming in shape at its entrance to the cross-section of the tang, whereby the tool may be correctly located relative to the handle, said hole being of a form and size for the remainder of its length to bind the tang in the handle as it is driven thereinto, substantially as set forth.

In witness whereof, I have hereunto set my hand and seal at Columbus, Indiana, this 23rd day of March, A. D. nineteen hundred and twenty-five.

WILLIAM FORREST BASSETT.

Witnesses:

GRACE FODREA,

J. MOODY GILLILAND.